United States Patent [19]

McKinney et al.

[11] 4,097,363
[45] Jun. 27, 1978

[54] THERMAL CRACKING OF LIGHT GAS OIL AT HIGH SEVERITY TO ETHYLENE

[75] Inventors: Joel Drexler McKinney; Raynor T. Sebulsky, both of Pittsburgh; Francis Edmund Wynne, Jr., Allison Park, all of Pa.

[73] Assignee: Gulf Research & Development Company, Pittsburgh, Pa.

[21] Appl. No.: 704,465

[22] Filed: Jul. 12, 1976

[51] Int. Cl.² .................... C10G 37/02; C10G 9/32; C07C 11/04
[52] U.S. Cl. ................................. 208/78; 208/61; 208/80; 208/89; 208/127; 208/216; 260/683 R
[58] Field of Search ............... 208/78, 130; 260/683

[56] References Cited

U.S. PATENT DOCUMENTS

| 2,731,508 | 1/1956 | Jahnig et al. | 208/53 |
| 2,768,127 | 10/1956 | Kimberlin et al. | 208/50 |
| 3,039,955 | 6/1962 | Honnold | 208/132 |
| 3,617,502 | 11/1971 | Stolfa et al. | 208/89 |
| 3,816,294 | 6/1974 | Wilson et al. | 208/61 |
| 3,839,484 | 10/1974 | Zimmerman et al. | 260/683 R |
| 3,898,299 | 8/1975 | Jones | 260/683 R |
| 3,922,216 | 11/1975 | Wilson et al. | 208/73 |
| 3,984,305 | 10/1976 | Hosoi et al. | 208/57 |

FOREIGN PATENT DOCUMENTS

| 1,361,671 | 7/1974 | United Kingdom | 208/61 |

Primary Examiner—Delbert E. Gantz
Assistant Examiner—G. E. Schmitkons

[57] ABSTRACT

A process for thermal cracking of petroleum light gas oil to produce a product including ethylene comprising passing said oil, a diluent gas and entrained hot solids through a cracking zone at a temperature between 1,300° and 2,500° F. at a relatively high cracking severity corresponding to a methane yield of at least 12 weight percent based on hydrocarbon feed oil and with a weight ratio of diluent gas to feed oil of at least 0.3. A naphtha feedstock can be separately cracked at a lower severity using a lower weight ratio of diluent gas to feed oil, with the inert solids from both cracking zones being sent to a common burner whose fuel comprises heavy oil product from both cracking zones.

19 Claims, 5 Drawing Figures

THERMAL CRACKING OF LIGHT GAS OIL AT HIGH SEVERITY TO ETHYLENE

This invention relates to a process for non-catalytic thermal cracking of light gas oil in the presence of a gaseous diluent and an entrained stream of inert heat carrier solids.

The present cracking process is directed towards the recovery of gaseous olefins as the primarily desired cracked product, in preference to gasoline range liquids. At least 15 or 20 weight percent of the feed oil is converted to ethylene. While ethylene is the single most prevalent gaseous product most of the feed oil is converted to both other gaseous products and to liquid products. Other valuable hydrocarbon gaseous products include propylene and 1,3-butadiene. Other $C_4$'s and ethane are also produced. Hydrogen is recovered as a valuable non-hydrocarbon gaseous product. Liquid products are produced in the cracking process by combination of intermediate olefinic material in the reactor and can comprise 40 to 50 weight percent or more of the total product. Recovered liquid products include benzene, mixtures of benzene, toluene and xylenes (BTX), gasoline boiling range liquids and light and heavy gas oils. The economic value of the various gaseous and liquid hydrocarbon products is variable and depends upon prevailing market conditions. Coke is a solid product of the process and is produced by polymerization of unsaturated materials. Most of the coke formed is removed from the process as a deposit upon the entrained inert heat carrier solids.

The proportions of the various products obtained depend significantly upon cracking severity, which can be expressed in terms of methane yield since methane is the ultimate hydrocarbon product. At a low severity, i.e. at methane yields below about 4 or 6 weight percent based on feed oil, yields of most products will be low. At a moderate severity, i.e. at methane yields above about 4 or 6 but below about 12 or 14 weight percent, optimum yields of intermediate olefins such as propylene and 1,3-butadiene will be realized. At high severities, i.e. at methane yields above about 12 or 14 weight percent, yields of propylene and 1,3-butadiene will decline and yields of very light materials, such as methane, hydrogen, and ethylene will tend to increase.

In the thermal cracking operation, a stream of hot solids supplied at a temperature above the average thermal cracker temperature is mixed with feed oil and a gaseous diluent, such as steam or other vapor, both supplied at a temperature below the average cracking temperature. There is no need to charge gaseous hydrogen to the thermal cracker. The components in the resulting mixture of feed oil, gaseous diluent and entrained solids flow concurrently through the thermal riser at an average riser temperature of 1,300° to 2,500° F. (704° to 1,371° C.) for a residence time between about 0.05 and 2 seconds. Endothermic cracking occurs in the thermal cracker so that the highest temperature occurs near the inlet of the riser, with the temperature falling slightly and gradually along the length of the riser. The thermal cracking reactor is elongated and has a high length to diameter ratio in the range of 4:1 to 40:1, generally, or 6:1 to 20:1, preferably. The reactor can be disposed either vertically or horizontally. Direction of flow is not important and in a vertically disposed riser flow can be directed either upwardly or downwardly. Most commonly, the reactor will be an elongated riser with preheated feed oil, steam diluent and hot solids flowing concurrently upwardly or downwardly through the riser at a sufficiently high velocity that the heat carrier solids are carried in entrained flow through the riser by flowing vapors. More than 98 or 99 percent of the hot solids flowing to the riser are recirculated solids. Essentially the only solids bled off from the solids circulation system are solids or ash contained in the feed oil or very fine solids resulting from attrition of the heating solids. The size of the entrained solid particles is not important as long as the solids are sufficiently small that there is little or no slippage between the inert solids and the flowing gases. Henceforth, for convenience the thermal cracking reactor will be considered to be a vertical upflow riser with steam as the diluent vapor.

The thermal reactor of the present invention is to be distinguished from a coil thermal cracking reactor which does not utilize hot solids as an internal heat carrier agency but wherein feed oil and steam diluent flow occurs through a coil disposed in a radiant, reflective furnace chamber enclosing an open flame. In the coil type reactor the flowing stream progressively becomes heated in transit through the coil so that the stream is at its lowest temperature at the coil inlet and progressively becomes heated during passage through the coil so that it is discharged from the coil at its highest temperature. Because a coil reactor is dependent for its heat requirements upon heat transfer across the wall of the coil and along the cross-section of the coil, the diameter of the coil must be considerably smaller then the diameter of the thermal riser of the present invention in order to provide a high ratio of heat transfer surface to tube cross-section. The thermal riser of the present invention can have a considerably larger diameter than the coil reactor since all the heat is added directly to the interior of the riser by means of hot inert solids. Most of the heat is carried into the interior of the riser by the hot inert solids while a smaller portion of heat is carried into the riser by diluent steam and preheated oil. Therefore, no heat transfer is required across the riser wall. Due to the endothermic nature of the reaction and because heat is not added across the reactor wall, the maximum inlet riser temperature gradually declines along the length of the reactor. This temperature gradient along the reactor is opposite to that of the coil reactor wherein a gradual temperature increase occurs along the length of the coil due to continual inward transfer of heat across the coil wall from the surrounding flame. The use of hot inert solids as a heat source is considerably more thermally efficient than an external flame because the temperature of the flame surrounding a coil cracker is generally about 2,800° F. (1,538° C.), while the temperature of the hot solids supplied to a riser is typically about 1,700° F. (927° C.).

During operation of the coil reactor, coke is continually deposited upon the walls of the coil. Because of the small diameter of the coil, e.g. about 5 inches (12.7 cm), or less, any deposited coke forms a relatively thick layer, thereby severely inhibiting further heat transfer across the coil and tending to plug the coil. Therefore, a coil cracker cannot tolerate more than about 0.5 weight percent conversion of the feed oil to coke. If coke conversion is above this level, frequent and costly decoking with steam or air is required. Therefore, the coil reactor is most efficiently used for cracking ethane, propane, butane and light oils, such as naphtha, and exhibits greatly depressed ethylene yields when the charge comprises a heavier oil, such as light gas oil or heavy gas oil. When cracking heavier oils, the coil cracker cannot operate at as high severities, as indicated by methane yield, as the process of the present invention, since coke deposits tend to increase with increasing cracking severity. This coking tendency is so pronounced with residual oils that cracking of residual oils in a coil cracker to produce olefins is not considered to be a feasible operation.

The oil feed to a coil cracker does not generally require desulfurization because although the coke formed contains most of the sulfur content of the feed oil, it is not subsequently burned. In contrast, the coke deposited on the solids of the present process is subsequently continuously burned in an external burner so that the sulfur in the feed oil is continuously emitted to the atmosphere as sulfur oxide pollutant. Therefore, in the present process if prevailing air pollution standards are to be met without resorting to stack gas scrubbing, high sulfur feed oil must be desulfurized to an extent which results in a sulfur oxide emission less than about 250 to 500 ppm by volume in the burner flue gas.

It is a particular advantage of the present process that some of the hydrogen consumed during desulfurization of the feed oil is recovered as molecular hydrogen. The hydrogen that is recovered is the hydrogen that is chemically combined with the hydrocarbon molecule, as contrasted to hydrogen that is converted to hydrogen sulfide. This hydrogen can be recovered since the high temperature thermal cracking process yields an olefinic product by splitting the relatively stable hydrogen to carbon bonds to produce free hydrogen, in addition to splitting the less stable carbon to carbon bonds. The present thermal cracking process is thereby contrasted to lower temperature cracking processes wherein the product is primarily paraffinic because cracking occurs by splitting carbon-carbon bonds and stops short of splitting the more stable carbon-hydrogen bonds.

Operation of the thermal riser of the present invention is not limited by coke formation on the reactor wall as in the case of the coil reactor because heat transfer across the reactor wall is not required and because the hot solids entrained in the reactor stream provide both a surface for the deposit of coke and a vehicle for its removal. Thereby, the entrained solids continuously carry off from the reactor most of the coke as it is formed. When heat is supplied internally, rather than across the riser wall, the diameter of the riser can be very large, for example about 30 to 40 inches (76.2 to 101.6 cm). Although most of the coke formed is carried out of the riser as particulate coke both on and off of the solids, some is dissolved in the heavy oils produced in the riser.

The entrained coke-coated solids leaving the thermal riser are passed to a burner wherein the coke is burned from the surface of the solids to both remove the coke and to heat the solids and thereby supply the required heat for the thermal cracking reaction during the next pass. While complete burn off will usually take place, such is not necessary and some coke can be recycled on the solids. Continuous addition to and removal of solids from the burner moderates combustion temperature and thereby tends to reduce or prevent formation of noxious nitrogen oxides from nitrogen present in the combustion air, which can occur during high temperature combustion. Since the solids do not normally contain sufficient coke to adequately heat the solids, supplementary fuel is supplied to the burner in the form of torch oil. Hot, substantially coke-free solids are continously removed from the burner and are recycled to the bottom of the thermal cracking riser to provide heat thereto. The thermal cracking process of the present invention requires a supply of hot solids at only a single temperature for admixture with feed oil to accomplish cracking and does not require a plurality of solid streams at different temperatures.

Use of inert solids to continuously carry coke deposits from the reactor, rather than permitting them to accumulate within the reactor and plug it, permits thermal cracking to be performed at a high severity. Thermal cracking at a high severity can be an advantageous mode of operation. Although propylene and butadiene yields reach a peak at moderate severities and then decline, the yields of other highly valuable products tend to increase with increasing severity, including ethylene (which tends to attain a relatively flat, elevated yield level at high severities), methane, aromatics and hydrogen. A thermal riser of this invention is capable of operating with higher boiling feed-stocks, at higher severities as measured by methane yield or other severity criteria and with lower levels of steam dilution to achieve a given ehtylene yield, as compared to a coil thermal cracker which does not employ hot solids.

In a thermal riser of this invention, the average riser temperature is between about 1,300° and 2,500° F. (704 and 1,371° C.), generally, between about 1,400 and 2,000° F.(760°and 1,093° C.), preferably, and between about 1,430 and 1,850° F. (777°and 1010° C.), most preferably. The feed oil can be preheated in advance of the riser, if desired, or feed oil preheating can be omitted. If the oil is preheated, any preheating temperature up to the temperature of oil vaporization or coking can be employed. Immediately upon leaving the riser, the product stream should be quenched to a temperature below about 1,300° F. (704° C.). Cold solids, water, steam and recycle oils are examples of suitable quench materials. A quench temperature below 1,300° F. (704° C.), such as between about 890°and 1,300° F. (477°and 704° C.), is suitable.

A dispersant gas, preferably steam, is supplied to the oil preheater or to the riser, if desired, in any amount up to about 2 pounds per pound (908 gm. per gm.) of hydrocarbon feed. The quantity of steam required tends to increase as the boiling point of the feedstock increases. A highly paraffinic feedstock generally requires less steam than a highly olefinic or alkyl aromatic feedstock. Although the use of steam favorably influences ethylene yield and selectivity, it is a very costly factor in cracker operation. As steam consumption increases, a point approaches where the cost of additional steam and the cost of its condensation is not compensated by the incremental ethylene yield or selectivity. Every incremental increase of steam employed must be more than compensated by the value of the resulting incremental increase in yield of ethylene or other products.

The pressure employed in the riser should be adequate to force the riser effluent stream through the down-stream separation equipment. The pressure will be between about 3 and 100 psig (0.2 and 7 kg/cm$^2$), generally, and between about 5 and 50 psig (0.35 and 3.5 kg/cm$^2$), preferably. A pressure above about 15 psig (1.05 kg/cm$^2$) will usually be required. The riser residence time can be between about 0.05 and 2 seconds, generally, or between about 0.05 and 0.5 seconds, preferably. Higher residence times induce either undesired olefin polymerization reactions or undesired cracking of light or heavy products. The weight ratio of solids to feed oil can be between about 4:1 and 100:1, generally, and between about 10:1 and 30:1, preferably. The hot solids can be supplied to the riser at any temperature which is at least about 50° F. (27.8° C.) above the riser outlet temperature, up to a maximum temperature of about 2,500°F. (1,371° C.). The temperature of the solids supplied to the riser will be about the temperature within the coker burner. Only one stream of solids at the desired temperature is generally required for the cracking operation. Any catalytically inert material or mixuture can serve as the solid heat carrier. Suitable materials include non-catalytic alumina, alundum, carborundum, coke, deactivated catalyst, etc. Neither the particle size nor the surface area of the inert solids is critical. Any size capable of passing through the riser in entrained flow with the reactant oil and steam diluent with little or no slippage can be employed. In one particular but non-limiting example, a particle size range of 5 to 150 microns with an average size of 70 microns, was supplied to the riser. During use, the particles undergo abrasion and reduction to a smaller size. The heat content in the solids entering the riser should be sufficient to supply at least 80 or 90 percent of the heat requirement of the cracker, which is approximately 350 BTU per pound of feed oil. This constitutes the entire heat supply beyond preheat of feed oil and the heat content of the diluent gas.

In the operation of the cracker riser, since methane is the ultimate hydrocarbon cracked product, an increasing methane yield is an indication of increasing severity. There are many ways that cracker severity can be changed. For example, changes can be made in temperature, residence time, feedstock, solids to oil ratio or recycle of crackable paraffins and olefins such as ethane, propane, propylene and butane. Because the solids riser can tolerate high coke yields, wide variations in severity are possible. While coil cracking of propylene is usually avoided because of a tendency of this material to coke, the present cracking process can recycle $C_3$, $C_4$ and $C_4+$ olefins, if desired.

An additional important advantage associated with the use of a solids heat carrier to supply more than 80 or 90 percent of the total cracker heat requirement arises when relatively high boiling feed oils are employed. If heavy oil fractions are subjected to excessive preheating in a coil preheater, they would tend to coke, thereby plugging and reducing the heat transfer efficiency of the preheater. In accordance with the present invention, preheating of heavy feed oils to the extent of inducing significant cracking or coking is avoided, and significant cracking or coking first occurs in the riser in the presence of the heat carrier solids. The heavy feed oils are not subjected to the most elevated process temperatures until contact with hot solids at the bottom of the riser.

In the thermal cracker, a number of secondary reactions occur which compete with the primary cracking reactions and which necessitate the very low residence times of the present invention. Olefins present in the feedstock or produced by cracking are not only more refractory to further cracking than are paraffins, but in addition they can condense to produce benzene, toluene, xylene and other aromatics. For this reason, olefinic feedstocks tend to be improved by hydrogenation. The aromatic materials produced have a variable economic value, depending upon market conditions. Higher molecular weight aromatics are also produced.

An unstable aromatic gasoline boiling range fraction is formed as well as aromatic light gas oil and heavy gas oil fractions. The higher boiling feedstocks of a given molecular type composition produce the most coke and heavy oil.

The heavier liquid product fractions can be utilized as a torch oil in the burner to supplement the fuel value of the coke on the solids. Torch oil is a lower cost fuel than the gas and naphtha fuels normally employed to provide the uniform radiant heat required in the furnace of a coil cracker. In the burner, the coke-laden solids are subjected to burning in the presence of air at a temperature above 1,700° F. (927° C.). The burner flue gases can be passed to an energy recovery unit, such as steam generator or a turbo-expander. The flue gases should contain less than about 250 to 500 ppm by volume of sulfur oxides in order to be environmentally acceptable. Otherwise, a stack gas scrubber will be required. Because of the elevated combustion temperatures, the concentration of carbon monoxide will be low even with little excess air. The relatively coke-free hot solids are returned to the riser.

The total product from the thermal riser can be separated into a plurality of distinct product fractions. The lightest fraction will comprise methane and hydrogen in a ratio of one mole of hydrogen to two moles of methane. Since an increase in methane yield is an indication of an increased in process severity, high severity processes provide the advantage of high hydrogen yields. The methane and hydrogen can be separated from each other in a cryogenic unit. The ethylene product fraction comprises the highest volume gaseous olefin product. Paraffinic feeds produce the highest ethylene yields, while aromatic feed components are refractory and do not tend to produce ethylene. As cracking temperatures and residence times increase, the ethylene yield reaches a flat maximum. Ethane, propane and propylene can each be separately recovered. A $C_4$ cut can be recovered. The $C_4$'s will comprise butanes, butenes and butadiene with traces of other $C_4$'s. Butadiene can be separated from the mixture for sale. A $C_5$-$C_{10}$ cut can be recovered as a source of gasoline and aromatics. Of the total 430° F.+(221° C.+) heavy oil product the heaviest portion can be used as torch oil in the process burner; can by hydrotreated and sold as fuel; or can be used to produce needle coke or binder pitch. About 12 to 15 percent of the feed oil to the thermal cracker is required as fuel in the burner to reheat the solids. This fuel can be derived primarily from process coke, with supplemental fuel, if any, coming from the heaviest liquid products of the process. A coke yield of 3 to 5 weight percent based on feed will generally be supplemented as fuel with heavy oil in a quantity of up to about 15 weight percent based on feed to provide adequate process heat.

We have discovered that in the described thermal cracking process, utilization of a light gas oil fraction as a feedstock at a relatively high cracking severity, corresponding to a methane yield of at least 12 or 14 weight percent, and up to 20 or 25 weight percent, or more, and with a relatively high steam dilution level, corresponding to a steam to hydrocarbon weight ratio of at least 0.3 or 0.4 and up to 1 or 1.5, or more, results in as high a yield of ethylene as compared to the thermal cracking of a feed stream comprising naphtha under comparable conditions. It is surprising that comparable ethylene yields are achieved when naphtha and light gas oil fractions are independently cracked at the same cracking severity and steam dilution levels. It has heretofore generally been observed in thermal cracking processes that with similar cracking conditions relatively low boiling feedstock fractions tend to produce higher yields of ethylene than are obtained from relatively high boiling feedstock fractions. The present discovery is not only surprising but also is economically advantageous since the ability to obtain a comparable ethylene yield from a higher boiling feedstock improves the economics of the cracking process because higher boiling fractions have a lower economic value than lower boiling fractions.

The ability of a light gas oil feedstock to provide as high an ethylene yield at a high severity and a high steam dilution level as a naphtha feedstock is particularly surprising in view of the further finding that under low severity cracking conditions and at a relatively low steam dilution level the same light gas oil feedstock is capable of providing only about the same ethylene yield as can be obtained with a heavy gas oil feedstock under similar conditions. Therefore, under lower severity conditions with a lower level of steam dilution, the light gas oil is an economically inferior thermal cracking feedstock because a comparable ethylene yield can be achieved with a less valuable heavy gas oil feedstock.

In general, thermal cracking at high severity is an advantageous mode of operation and is rendered particularly feasible in a thermal cracking operation using inert solids to continously carry coke deposits from the reactor, as contrasted to the use of a coil reactor wherein coke deposits accumulate and induce plugging. Although propylene and butadiene yields reach a peak at moderate seveities and then decline with increasing severity, the yields of other highly valuable products tend to increase with increasing severity. The high severity-high yield products include ethylene (which tends to achieve a flat production level at high severities), methane, aromatics and hydrogen. At the present time, the value of these high severity-high yield cracked products is increasing more rapidly than the value of the cracked products whose yields peak at low severity, including propylene and 1,3-butadiene.

The presence of heavy gas oil in the light gas oil feedstock is disadvantageous because at the high cracking severities of this invention the ethylene yield from heavy gas oil versus increasing severity has plateaued while the yields of the relatively more valuable propylene and 1,3-butadiene products are declining. Therefore, at the high severities of this invention the yields of propylene and 1,3-butadiene from heavy gas oil are declining with little or no compensating advantage in terms of ethylene yield. On the other hand, at high cracking severities and ethylene yield from a light gas oil feedstock tends to gradually increase with increasing severity.

In a further embodiment of this invention, a feedstock comprising predominantly a light gas oil fraction and a feedstock comprising predominantly a naphtha fraction are separately cracked in parallel reactors, with the light gas oil reactor operating at a relatively high severity and the naphtha reactor operating at a relatively low severity. Of the two reactors, the light gas oil riser will produce the higher yield of ethylene while the naphtha riser will produce the higher yields of propylene and 1,3-butadiene. The yields of the individual products from both reactors can be combined. In this manner, elevated total yields including all products and a more balanced mixture of these products are obtained than if the naphtha and light gas oil fractions were cracked in a common riser or otherwise cracked under common conditions or at a common severity.

In practicing the parallel reactor embodiment, a wide boiling range petroleum hydrocarbon oil can be fractionated to produce a naphtha fraction and a light gas oil fraction which are cracked in separate risers. Of the two risers, the light gas oil riser operates under the severity and steam dilution conditions described above for cracking light gas oil, while the naphtha riser operates under a relatively more mild cracking severity in terms of methane yield, at which it is capable of producing optimum yields of valuable olefins other than ethylene, such as propylene and 1,3-butadiene. These olefins can be produced at a higher yield from a naphtha feedstock than from a light gas oil feedstock, regardless of cracking severity. Also, the gasoline yield obtained by cracking a naphtha feedstock at a mild severity is enhanced to a level above that obtainable from a light gas oil feedstock regardless of severity. Advantageously, the steam to hydrocarbon weight ratio employed in the naphtha riser is lower than that employed in the light gas oil riser.

In accordance with the present invention, naphtha is considered to be a $C_5$ to 400° F. (240° C.) fraction and light gas oil is considered to be a 400° to 650° F. (240° to 343° C.) fraction. The naphtha feedstock can comprise at least 50, 75 or 90 volume percent naphtha, or can comprise essentially all naphtha. The light gas oil feedstock can comprise at least 50, 75 or 90 volume percent light gas oil, or can comprise essentially all light gas oil. The non-light gas oil components of this feedstock can comprise some naphtha and some heavy gas oil, in which case the amounts of naphtha and of heavy gas oil can be about equal, if desired. It is advantageous that the light gas oil feedstock be as free of 650° F. + (343° C.+) heavy gas oil as possible because the heavy oil will be subjected to a cracking severity which is above its optimum and because of the widely different steam dilution ratios required for effective thermal cracking of these two oils. While the light gas oil produces a high ethylene yield with a 0.5 steam to oil weight ratio, a heavy gas oil produces a considerably lower ethylene yield with even a 1.0 weight steam dilution ratio. Therefore, the steam economy in terms of ethylene yield in the light gas oil riser is diminished to the extent that 650° F. (343° C.) heavy gas oil is present. Also, the light gas oil and the naphtha feedstocks should be as free as possible of each other in order to obtain the advantage to the greatest extent possible of specialized operating conditions for these two feedstocks. To the extent that the light gas oil feedstock is diluted with naphtha, the economic advantage of utilizing a relatively low value feedstock is lost.

The light gas oil riser is operated under a relatively high severity at which a relatively high yield of ethylene is obtained, permitting the naphtha riser to operate at a relatively low severity at which a lower yield of ethylene is obtained but at which higher yields of propylene, 1,3-butadiene and gasoline are obtained than could be obtained from the light gas oil riser regardless of severity. By cracking the naphtha and light gas oil fractions of a single crude oil or of separate crudes in separate risers at different severities and possibly at different steam dilution levels, a combined effluent stream can be obtained having a high combined ethylene yield, together with high combined yields of propylene, 1,3-butadiene and gasoline. If the full range feed oil were cracked in a single riser, the same high combined yields of propylene, 1,3-butadiene and gasoline could only be obtained at the expense of a lower ethylene yield than is possible in accordance with the present invention.

The naphtha cracking riser, especially under the relatively low cracking severity conditions it employs, produces a low yield of both coke and heavy oil boiling above the gasoline range. The amount of coke and heavy oil produced by the naphtha riser under conditions of low severity upon combustion is insufficient to supply the heat requirements for the naphtha riser. On the other hand, operation of the light gas oil riser under relatively more severe conditions provides more coke and heavy oil than is required for heating requirements for the light gas oil riser. The heavy oil product of thermal cracking is a low hydrogen content, very refractory oil and is therefore only suitable for use as a fuel. Therefore, in accordance with the present invention, the coke-laden solids recovered from the two risers are passed to a common burner and at least the residual fractions of the heavy oil obtained from both risers are blended for use as burner fuel. In this manner, the inability of the coke and heavy oil products of the naphtha riser to satisfy the heat requirement for the naphtha riser, is balanced by the excess of heat content of the coke and heavy oil product from the light gas oil riser over the heat requirement for the light gas oil riser. Coke and residual oil from each riser is combined to produce a total fuel which is adequate to supply the heat requirements for the two risers in a common burner.

As stated, the light gas oil riser is operated under sufficiently severe conditions that the ethylene yield is as high as can be achieved if a naphtha feed were cracked under those conditions. Such severe conditions correspond to a methane yield of at least 12 or 14, and up to 20 to 25 weight percent, or more, and may include a steam to hydrocarbon weight ratio of at least 0.3 or 0.4, and up to 1 or 1.5 or more. The naphtha riser is then free to operate under relatively less severe conditions and, if desired, with a relatively lower steam dilution level than is employed in the light gas oil riser, at which near optimum yields of propylene and 1,3-butadiene are achieved. This method magnifies the combined yields of ethylene, propylene, 1,3-butadiene and gasoline, respectively, as compared to the respective yields of these materials obtainable if the naphtha and light gas oil fractions are cracked under common conditions.

An anomalous product distribution from the respective risers is observed due to the specialized riser operating conditions. Of the two feedstocks, the light gas oil feedstock produces the highest yields of both the light and the heavy hydrocarbon products, the light hydrocarbon product being ethylene and the heavy hydrocarbon products being coke and heavy oil. In contrast, the naphtha feedstock produces the highest yields of the intermediate products, including propylene, 1,3-butadiene and gasoline. It is observed in most processes that shifting the boiling point of a feedstock in one direction will result in a shift in array of products uniformly in one direction. In contrast, in accordance with this invention, use of the light gas oil feedstock enhances production of the extremity products, i.e. the light and heavy hydrocarbon products, while the use of the naphtha feedstock diminishes production of both of these extremity products while enhancing production of valuable intermediate boiling range hydrocarbon products.

To illustrate the present invention, a series of thermal cracker runs were performed to compare the array of products obtained from various petroleum feedstocks including naphtha, hydrodesulfurized light gas oil and hydrodesulfurized heavy gas oil in both a rising temperature profile coil cracker without the use of hot solids and in a thermal riser utilizing hot solids and having a falling temperature profile.

The naphtha feedstock employed was a Kuwait full range naphtha having the following analysis:

| NAPHTHA FEEDSTOCK | |
|---|---|
| Gravity, D287: ° API | 64.7 |
| Sp Gravity: 60/60° F. (15.6/15.6° C.) | 0.721 |
| Carbon and Hydrogen | |
| Carbon: Wt. % | 84.80 |
| Hydrogen: Wt. % | 14.89 |
| Sulfur: Wt. % | 0.01 |
| Nitrogen: ppm | 0.3 |
| Hydrocarbon Types: Vol. % | |
| Isoparaffins | 44.86 |
| Normal Paraffins | 31.26 |
| Cycloparaffins | 15.88 |
| Aromatics | 8.00 |
| Distillation, D86: ° C. (° F.) Vol. % | |
| IBP | 50 (122.0) |
| 10 | 77 (170.6) |
| 30 | 96 (204.8) |
| 50 | 117 (242.6) |
| 70 | 135 (275.0) |
| 90 | 158 (316.4) |
| EP | 182 (359.6) |

The light gas oil feedstock employed was a Kuwait hydrodesulfurized light gas oil having the following analysis:

| LIGHT GAS OIL FEEDSTOCK | |
|---|---|
| Pour Point, D97: ° F. (° C.) | +15(−9.4° C.) |
| Carbon Residue, Ramsbottom D524: Wt. % | 0.06 |
| Aniline Point, D611: ° C. | 74.0 |
| Gravity, D287: ° API | 39.4 |
| Specific Gravity: 60/60° F. (15.6/15.6° C.) | 0.828 |
| Carbon and Hydrogen | |
| Carbon: Wt. % | 86.30 |
| Hydrogen: Wt. % | 13.73 |
| Sulfur: Wt. % | 0.14 |
| Nitrogen: ppm | 41 |
| Nickel: ppm | 0.10 |
| Vanadium: ppm | 0.10 |
| Hydrocarbon Types: Vol. % | |
| Isoparaffins | 33.4 |
| Normal Paraffins | 23.5 |
| Cycloparaffins | 23.0 |
| Noncondensed Cycloparaffins | 13.2 |
| Condensed Dicycloparaffins | 8.2 |
| Condensed Tricycloparaffins | 1.6 |
| Aromatics | 19.6 |
| Alkylbenzenes | 6.5 |
| Noneluted (probably aromatics) | 0.5 |
| Distillation, D1160: ° C. (° F.) at 760 mm Vol. % | |
| IBP | 193 (379.4) |
| 10 | 238 (460.4) |
| 30 | 271 (519.8) |
| 50 | 293 (559.4) |
| 70 | 318 (604.4) |
| 90 | 351 (663.8) |
| EP | 389 (732.2) |

The heavy gas oil feedstock was a Kuwait hydrodesulfurized heavy gas oil having the following analysis:

| HEAVY GAS OIL FEEDSTOCK | | |
| --- | --- | --- |
| | Prior to Hydrodesulfurization | After Hydrodesulfurization |
| Flash Point, D93: ° F. (° C.) | | 230.0(110° C.) |
| Viscosity, D2161: SUS at 210° F. (99° C.) | | 44.2 |
| Pour Point, D97: ° F. | | +90.0 |
| Carbon Residue, Ramsbottom: Wt. % | | 0.09 |
| Aniline Point, D611:° C. | | 87.0 |
| Gravity, D286: ° API | | 28.0 |
| Specific Gravity: 60/60° F. (15.6/15.6° C.) | | 0.887 |
| Carbon and Hydrogen: | | |
| Carbon: Wt. % | 85.07 | 86.69 |
| Hydrogen: Wt. % | 12.05 | 12.69 |
| Sulfur: Wt. % | 2.83 | 0.10 |
| Nitrogen: Wt. % | | 0.047 |
| Nickel: ppm | | 0.10 |
| Vanadium: ppm | | <0.10 |
| Hydrocarbon Type: Vol.% | | |
| Isoparaffin | | 14.2 |
| Normal Paraffin | | 3.1 |
| Cycloparaffin | | 34.8 |
| Noncondensed | | 21.6 |
| Condensed | | 13.2 |
| 2 Ring | | 6.9 |
| 3 Ring | | 3.0 |
| 4 Ring | | 1.7 |
| 5 Ring | | 0.8 |
| 6 Ring | | 0.7 |
| Aromatics | | 45.2 |
| Benzenes | | 17.7 |
| Noneluted (probably aromatics) | | 2.8 |
| Distillation, D1160: ° C. (° F.) at 760 mm: | | |
| Vol. % | | |
| 10 | | 354 (669.2) |
| 30 | | 402 (755.6) |
| 50 | | 438 (820.4) |
| 70 | | 468 (874.4) |
| 90 | | 507 (944.6) |
| EP | | 541 (1005.8) |

Following are some spot conditions employed for the thermal tests utilizing the process of this invention for cracking the three feedstocks.

| Feed Oil | Naphtha | Light Gas Oil | Heavy Gas Oil |
| --- | --- | --- | --- |
| Operating Conditions | | | |
| Feed Preheat Temp.: ° F. (° C) | 689(365) | 419(215) | 310(154) |
| Solids Preheat Temp.: ° F. (° C.) | 1816(985) | 1669(910) | 1756(957) |
| Transfer Line Avg. Temp.: ° F. (° C.) | 1537(836) | 1416(769) | 1607(874) |
| Lower Riser Inlet Temp.: ° F. (° C.) | 1559(848) | 1519(826) | 1675(913) |
| Upper Riser Outlet Temp.: ° F. (° C.) | 1529(832) | 1362(739) | 1581(866) |
| Primary Quench Temp.: ° F. (° C.) | 1114(601) | 1095(591) | 1192(644) |
| Steam to Feed Weight Ratio | 0.496 | 0.515 | 0.495 |
| Argon Diluent to Feed Weight Ratio | 0.090 | 0.068 | 0.086 |
| Quench Water to Feed Weight Ratio | 0.222 | 0.113 | 0.375 |
| Solids to Feed Weight Ratio | 10.0 | 9.6 | 10.6 |
| Reactor Pressure: psia(kg/cm$^2$) | 24.32(1.7) | 24.26(1.69) | 24.17(1.69) |
| Reactor Velocity: ft/sec(km/hr) | 26.80(29.5) | 25.66(28.23) | 26.48(29.13) |
| Reactor Residence Time: sec. | 0.397 | 0.405 | 0.385 |

Figure 1A:
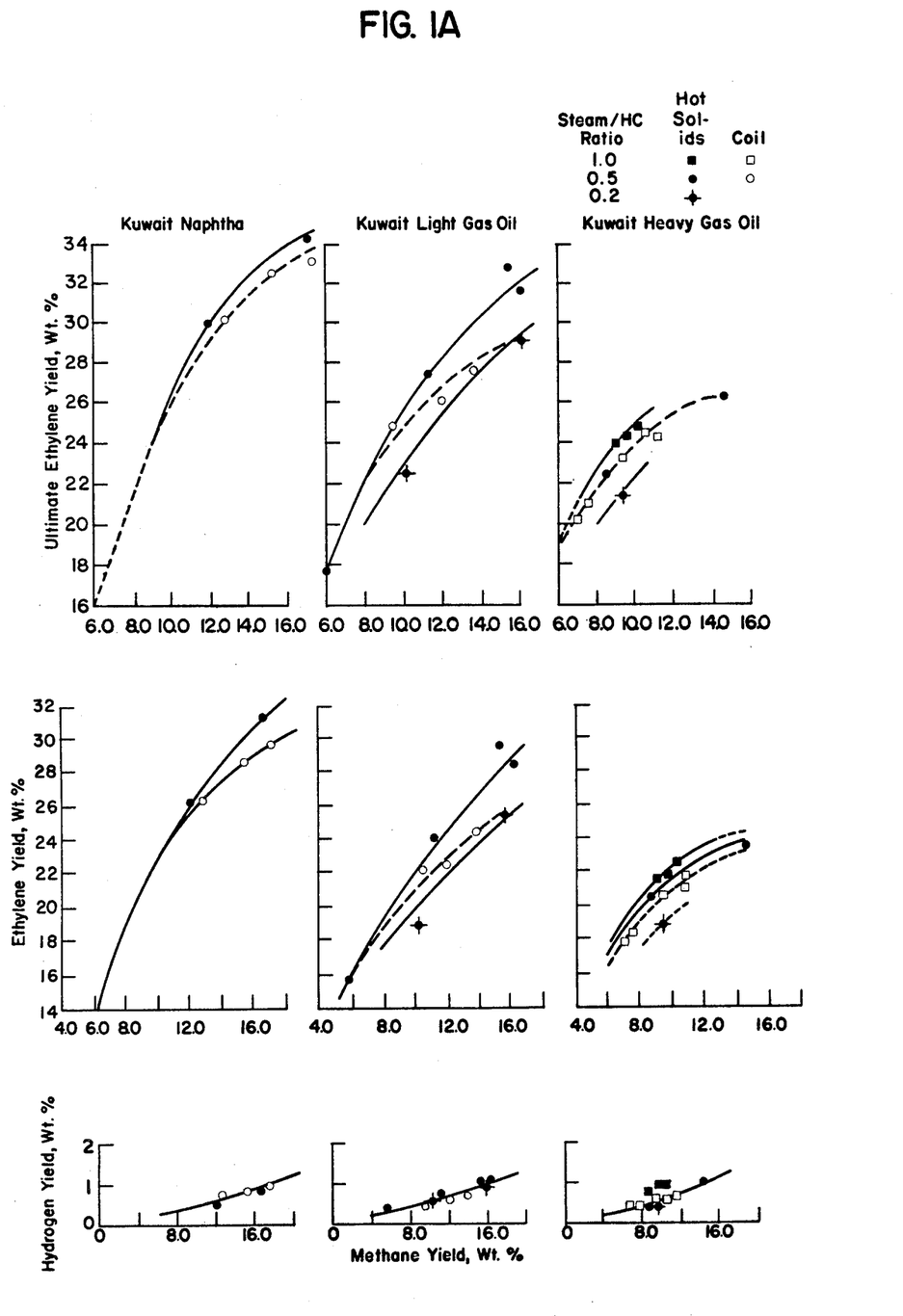
Figure 1B:
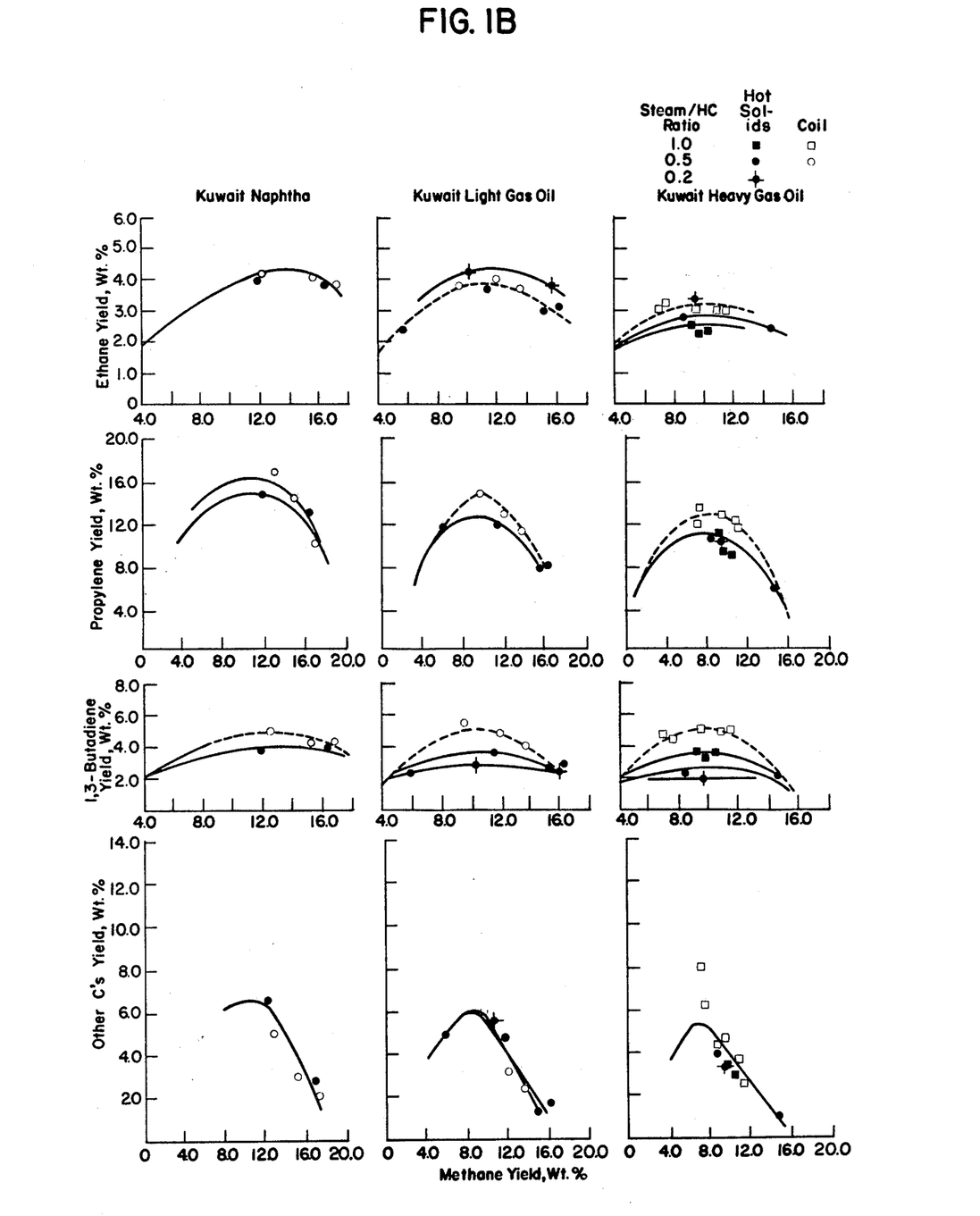
Figure 1C:
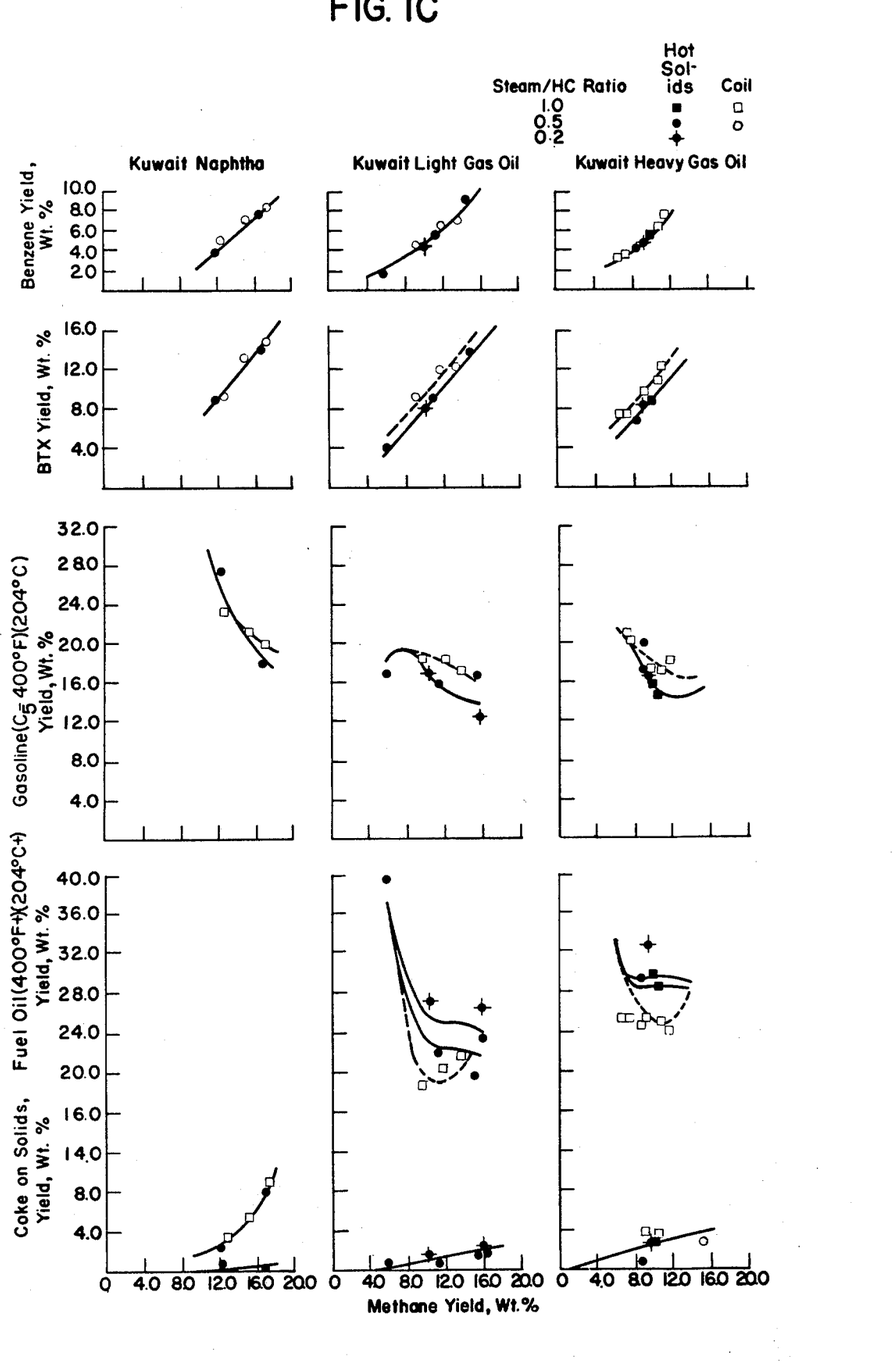

The results of these tests are presented in graphic form in FIGS. 1A, 1B and 1C. These three figures show the yields of various cracked products based on feed obtained at various severities, as expressed by methane yield based on feed, and at various steam to oil weight ratios, when cracking Kuwait naphtha, hydrodesulfurized Kuwait light gas oil and hydrodesulfurized Kuwait heavy gas oil in both a coil cracker which does not utilize hot solids and in a hot solids cracker of the present invention. The yields shown in FIGS. 1A, 1B and 1C include ultimate ethylene yield (which is the ethylene yield plus 0.8 times the sum of the ethane and acetylene yields), single pass ethylene yield, hydrogen, ethane, propylene, 1,3-butadiene, other hydrocarbons, benzene, BTX, gasoline, fuel oil and coke. The light gas oil data of FIG. 1A show that the ethylene yield is greater than the methane yield on a weight basis.

FIG. 1A shows that when a light gas oil feedstock is employed at a relatively high cracking severity and a high steam dilution level the ethylene yield obtained is comparable to the ethylene yield obtained when employing an economically more valuable naphtha feedstock. That comparable ethylene yields are obtained from light gas oil and naphtha feedstocks is particularly surprising because it has heretofore been observed that relatively lower boiling, more valuable feedstocks produced higher ethylene yields than higher boiling, less valuable feedstocks. FIG. 1A shows that the advantage of elevated steam dilution levels on ethylene yields tends to become magnified with increasing cracking severity so that the use of a light gas oil feedstock, a high cracking severity and a high steam dilution level are interdependent features with a hot solids cracker.

FIG. 1A further shows that with a coil cracker as the boiling point of the feedstocks increases, the hydrogen yield obtainable tends to decrease. In contrast, FIG. 1A further shows that when a hot solids cracker is employed a constant hydrogen yield is obtained as the boiling range of the feedstock increases, as indicated by the fact that the hot solids cracker produces progressively higher hydrogen yields than the coil cracker as the boiling point of the feedstocks increase. Since hydrogen is an economically valuable product, the FIG. 1A hydrogen yield data show a distinct advantage in utilizing feedstocks boiling above the naphtha range in thermal crackers utilizing hot solids.

FIG. 1B shows that the yields of propylene and 1,3-butadiene peak at moderate cracking severities and then decline with increasing severity. In general, relatively low boiling feedstocks produce the highest yields of these materials at a given steam dilution level.

FIGS. 1A and 1B indicate that the highest yield of the ethylene-propylene-1,3-butadiene product array obtainable from a hot solids cracking system from a naphtha-light gas oil boiling range feedstock can be achieved by cracking the light gas oil component independently at a high severity to obtain a high yield of ethylene and cracking the naphtha component independently at a lower severity to obtain high and relatively optimum yields of propylene and 1,3-butadiene. In addition, FIG. 1C shows that a further advantage of cracking naphtha at a lower severity is that a higher gasoline yield can be obtained with a naphtha feedstock at a low cracking severity than is obtained when cracking heavier oils regardless of severity.

Figure 2:
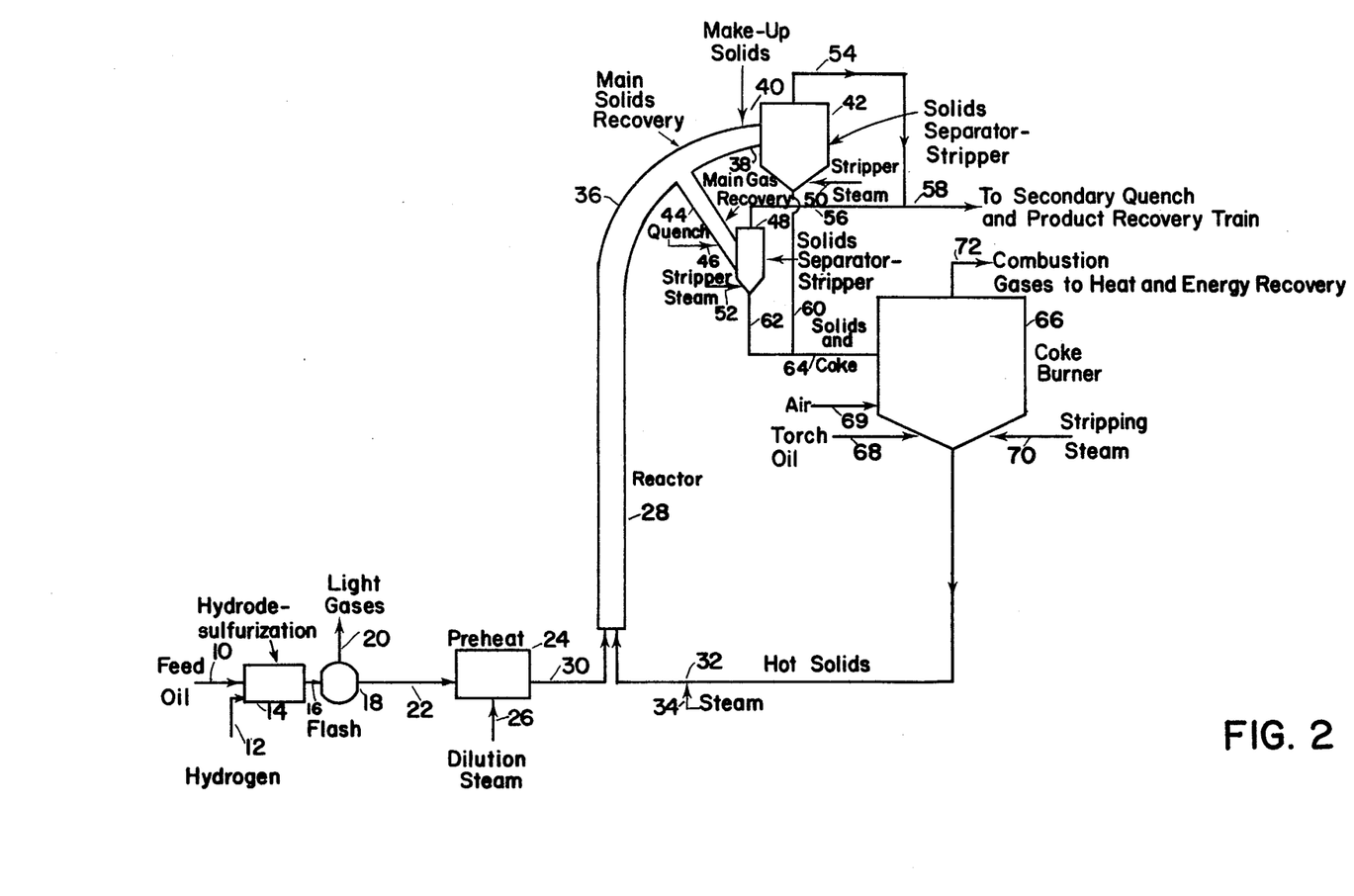

The process of this invention is illustrated in FIG. 2. As shown in FIG. 2, thermal cracker feed oil entering through line 10 and hydrogen entering through line 12 pass through hydrodesulfurization zone 14. Hydrodesulfurization effluent passes through line 16 and enters flash chamber 18 from which contaminating gases including hydrogen sulfide, ammonia and methane are removed overhead through line 20, while flash liquid is removed through line 22. The flash liquid passes through preheater 24, is admixed with dilution steam entering through line 26 and then flows to the bottom of thermal cracking reactor 28 through line 30.

A steam of hot regenerated solids is charged through line 32 and admixed with steam entering through line 34 prior to entering the bottom of riser 28. The oil, steam and hot solids pass is entrained flow upwardly through riser 28 and are discharged through a curved segment 36 at the top of the riser to induce centrifugal separation of solids from the effluent stream. A stream containing most of the solids passes through riser discharge segment 38 and can be quenched, if desired, with make-up solids entering through line 40 before entering solids separator-stripper 42. Another stream containing most of the cracked product is discharged axially through conduit 44 and can be cooled by means of a quench stream entering through line 46 in advance of solids separator-stripper 48.

Stripper steam is charged to solids separators 42 and 48 through lines 50 and 52, respectively. Product streams are removed from solids separators 42 and 48 through line 54 and 56, respectively, and then combined in line 58 for passage to a secondary quench and product recovery train, not shown. Coke-laden solids are removed from solids separators 42 and 48 through lines 60 and 62, respectively, and combined in line 64 for passage to coke burner 66. If required, torch oil can be added to burner 66 through line 68 while stripping steam is added through line 70. Combustion gases are removed from the burner through line 72 for passage to heat and energy recovery systems, not shown, while regenerated hot solids which are relatively free of coke are removed from the burner through line 32 for recycle to riser 28.

Figure 3:
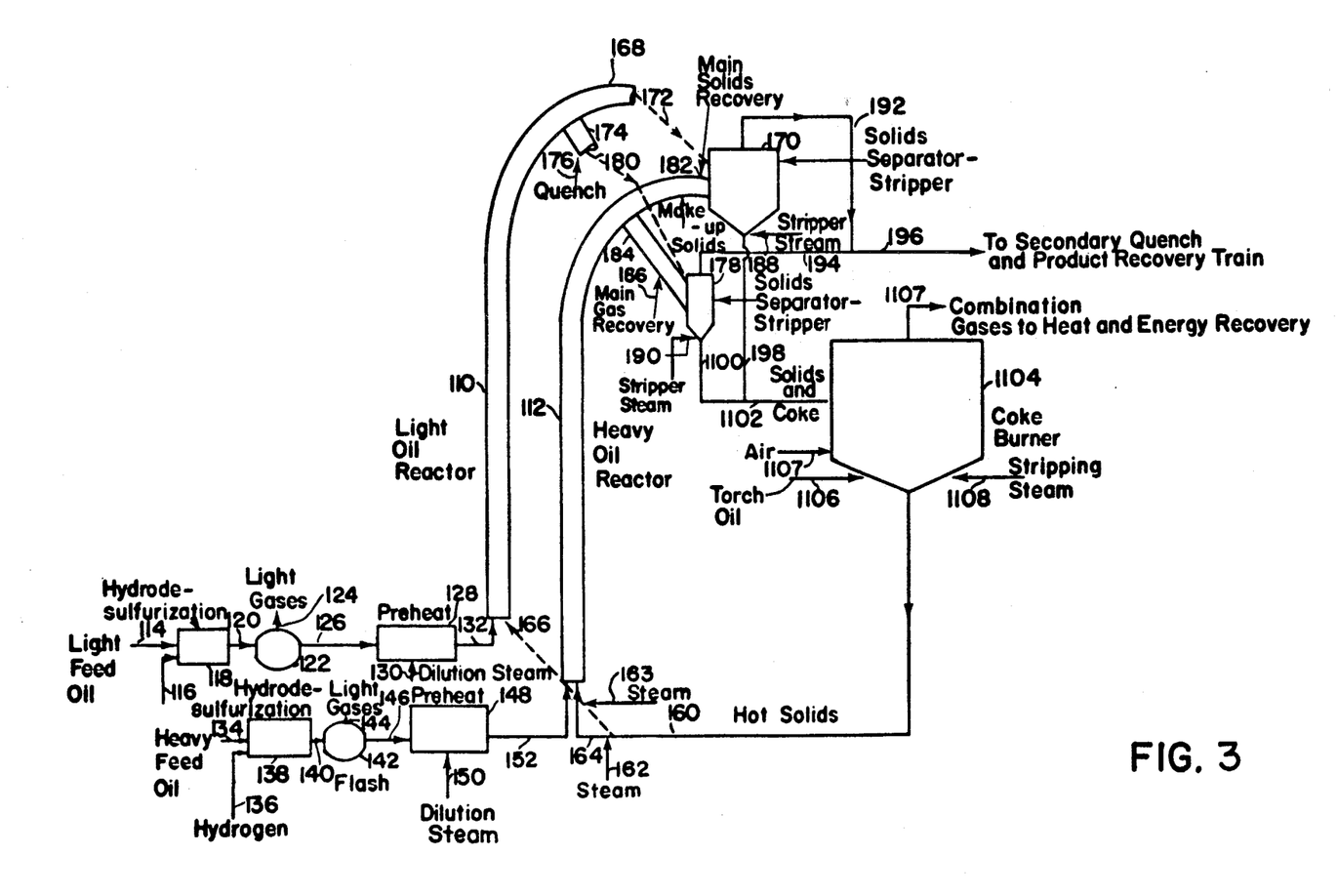

FIG. 3 illustrates the parallel riser cracker embodiment of this invention.

FIG. 3 shows a light oil cracker riser 110 and a heavy oil cracker riser 112. Light feed oil entering through line 114 and hydrogen entering through line 116 pass to hydrodesulfurization zone 118 from which a hydrodesulfurized effluent is removed through line 120 for passage to flash chamber 122. Light gases comprising hydrogen sulfide, ammonia and methane are removed from flash chamber 122 through line 124. Flash liquid passes through line 126 to preheat zone 128 wherein it is admixed with dilution steam entering through line 130 prior to passage through line 132 to the bottom of thermal riser 110.

A heavy feed oil stream entering through line 134 and hydrogen entering through line 136 enter hydrodesulfurization zone 138 and hydrodesulfurized effluent passing through line 140 enters flash chamber 142. Light gases comprising hydrogen sulfide, ammonia and methane are removed from flash chamber 142 through line 144. Flash liquid in line 146 enters preheater 148 wherein it is admixed with dilution steam entering through line 150 prior to passage through line 152 to the bottom of heavy oil cracking riser 112.

One portion of the hot regenerated solids in line 160 together with steam entering through line 162 enters the bottom of heavy oil cracker 112 through line 164 and another portion enters the bottom of light oil cracker 110 through line 166 together with steam entering through line 163. The light oil cracker has a main solids recovery zone 168 which leads to solids separator-stripper 170, as indicated at 172. The light oil reactor also has an axial main gas recovery conduit 174 which is provided with a quench fluid entering through line 176 and which discharges into solids separator-stripper 178, as indicated at 180. The heavy oil riser 112 has a main solids recovery segment 182 which also leads into solids separator-stripper 170 and has a main gas recovery conduit 184 which is provided with a quench fluid entering through line 186 and which discharges into solids separator-stripper 178. Solids separator-stripper 170 is provided with stripping steam entering through line 188 while separator-stripper 178 is provided with stripping steam entering through line 190. The cracked products from solids separator 170 are removed through line 192 while the cracked products from solids separator 178 are removed through line 194. Cracked product streams 192 and 194 are blended in line 196 and passed to a secondary quench and product recovery train, not shown. Coke-laden solids from separator 170 in line 198 and from separator 178 in line 1100 are blended in line 1102 and passed to coke burner 1104. Torch oil is passed to burner 1104, if required, through line 1106, while stripping steam in charged through line 1108. Combustion gases are removed from the coke burner through line 1107 and passed to a heat and energy recovery system, not shown. Hot substantially coke-free regenerated solids are removed from the burner through line 160 for passage to the bottom of the thermal risers.

We claim:

1. A process for producing ethylene by thermally cracking a hydrocarbon feed at least 90 volume percent of which comprises a light gas oil fraction of a crude oil boiling between 400° and 650° F. comprising passing said hydrocarbon feed, a diluent gas, and entrained inert hot solids through a cracking zone at a temperature between 1,300° and 2,500° F. for a residence time of 0.05 to 2 seconds, the weight ratio of diluent gas to feed oil being at least 0.3, the cracking severity corresponding to a methane yield of at least 12 weight percent based on said feed oil, and quench cooling said product immediately upon leaving said cracking zone to a temperature below 1,300° F. so that the ethylene yield is greater than the methane yield on a weight basis.

2. The process of claim 1 wherein the diluent gas is steam.

3. The process of claim 1 wherein said methane yield is at least 14 weight percent.

4. The process of claim 1 wherein said weight ratio is at least 1.

5. The process of claim 1 wherein essentially all of said hydrocarbon feed comprises a light gas oil fraction of a crude oil boiling between 400° and 650° F.

6. The process of claim 1 wherein said light gas oil fraction of a crude oil has been hydrodesulfurized.

7. A process for thermally cracking first and second hydrocarbon feeds to produce first and second products including ethylene comprising passing said first hydrocarbon feed at least 90 volume percent of which comprises a petroleum light gas oil fraction of a crude oil boiling between 400° and 650° F., a diluent gas, and entrained inert hot solids through a first cracking zone at a temperature between 1,300° and 2,500° F. for a residence time of 0.05 to 2 seconds, the weight ratio of diluent gas to feed oil being at least 0.3, at a cracking severity corresponding to a methane yield of at least 12 weight percent based on said first feed oil, and quench cooling said first product immediately upon leaving said first cracking zone to a temperature below 1,300° F. so that the ethylene yield is greater than the methane yield on a weight basis; passing said second hydrocarbon feed comprising primarily a $C_5$ to 400° F. naphtha fraction, a diluent gas and a stream of entrained inert hot solids through a second cracking zone at a temperature between 1,300° and 2,500° F. for a residence time between 0.05 and 2 seconds and at a cracking severity corresponding to a methane yield below the methane yield in said first cracking zone, quench cooling said second cracked product immediately upon leaving said second cracking zone to a temperature below 1,300° F., and combining first and second cracked product.

8. The process of claim 7 wherein said light gas oil fraction of a crude oil has been hydrodesulfurized.

9. The process of claim 7 wherein the methane yield in said second cracking zone is below 12 weight percent.

10. The process of claim 7 wherein said $C_5$ to 400° F. fraction comprises at least 75 volume percent of said second feed oil.

11. The process of claim 7 wherein said $C_5$ to 400° F. fraction comprises at least 90 volume percent of said second feed oil.

12. The process of claim 8 wherein essentially all of said first hydrocarbon feed comprises a petroleum light gas oil fraction of a crude oil boiling between 400° and 650° F.

13. The process of claim 7 wherein the diluent gas in said first and second cracking zones is steam.

14. The process of claim 7 wherein the percentage of ethylene based on feed in the product from the first cracking zone is greater than in the product from said second cracking zone.

15. The process of claim 7 wherein the products from said first and second cracking zones contain propylene, and the percentage of propylene based on feed in the product from said second cracking zone is greater than in the product from said first cracking zone.

16. The process of claim 7 wherein the products from said first and second cracking zones contain 1,3-butadiene and the percentage of 1,3-butadiene based on feed in the product from said second cracking zone is greater than in the product from said first cracking zone.

17. The process of claim 7 wherein the weight ratio of diluent gas to feed oil in said second cracking zone is lower than the ratio in said first cracking zone.

18. The process of claim 7 wherein the hot solids from said first and second cracking zones are passed to a common coke burner, the products from said first and second cracking zones include liquid oils, and passing the residue portion of the liquid oils from both said first and second cracking zones to said coke burner as fuel.

19. The process of claim 7 wherein said first and second feedstocks are obtained by distilling a wide boiling range oil.

* * * * *